United States Patent
Enomura

(10) Patent No.: US 12,179,162 B2
(45) Date of Patent: Dec. 31, 2024

(54) VACUUM DEAERATOR

(71) Applicant: M. Technique Co., Ltd., Izumi (JP)

(72) Inventor: Masakazu Enomura, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 496 days.

(21) Appl. No.: 17/602,636

(22) PCT Filed: Oct. 29, 2019

(86) PCT No.: PCT/JP2019/042273
§ 371 (c)(1),
(2) Date: Oct. 8, 2021

(87) PCT Pub. No.: WO2020/208845
PCT Pub. Date: Oct. 15, 2020

(65) Prior Publication Data
US 2022/0161156 A1    May 26, 2022

(30) Foreign Application Priority Data

Apr. 9, 2019 (WO) .................. PCT/JP2019/015523
Apr. 15, 2019 (WO) .................. PCT/JP2019/016233
(Continued)

(51) Int. Cl.
*B01F 25/45* (2022.01)
*B01D 19/00* (2006.01)
(Continued)

(52) U.S. Cl.
CPC .......... *B01F 25/45* (2022.01); *B01D 19/0036* (2013.01); *B01D 19/0047* (2013.01);
(Continued)

(58) Field of Classification Search
None
See application file for complete search history.

(56) References Cited

U.S. PATENT DOCUMENTS

2019/0060792 A1*  2/2019  Fan .................... B01D 19/0052

FOREIGN PATENT DOCUMENTS

DE   102010043756 A1 *  5/2012  ......... B01D 19/0052
JP   63-151308 A    6/1988
(Continued)

OTHER PUBLICATIONS

English language machine translation for DE 102010043756 A1. Retrieved from translationportal.epo.org on Jan. 16, 2024. (Year: 2024).*

(Continued)

*Primary Examiner* — Jason M Greene
(74) *Attorney, Agent, or Firm* — Birch, Stewart, Kolasch & Birch, LLP

(57) ABSTRACT

A vacuum deaerator degasses material to be processed by placing a rotating rotor with a screen in a vacuum vessel, introducing a liquid material to be processed into the rotor from the interior thereof and causing the liquid to pass through the screen to refine the same. The vacuum deaerator is characterized in that: the screen is a cylinder with a circular cross-section and is in the form of a porous plate in which a plurality of through holes are opened in the radial direction of the cylindrical screen; and the screen is provided such that the area of inflow openings is greater than the area of outflow openings, where the inflow openings are openings of a plurality of penetration portions provided on the inner wall face of the screen and the outflow openings are openings of the plurality of penetration portions provided on the outer wall dace of the screen. Thus, the processing capacity of the vacuum deaerator is improved without increasing the size of the device.

12 Claims, 3 Drawing Sheets

(30) Foreign Application Priority Data

May 27, 2019 (WO) .................. PCT/JP2019/020976
Aug. 22, 2019 (WO) .................. PCT/JP2019/032869
Sep. 26, 2019 (WO) .................. PCT/JP2019/037989

(51) Int. Cl.
  *B01F 25/452* (2022.01)
  *B01F 27/81* (2022.01)
  *B01F 27/91* (2022.01)
  *B01F 27/92* (2022.01)
  *B01F 27/921* (2022.01)

(52) U.S. Cl.
  CPC ...... *B01D 19/0052* (2013.01); *B01F 25/4523* (2022.01); *B01F 27/8111* (2022.01); *B01F 27/91* (2022.01); *B01F 27/911* (2022.01); *B01F 27/92* (2022.01); *B01F 27/9213* (2022.01); *B01F 27/9214* (2022.01); *B01F 2215/0422* (2013.01); *B01F 2215/0431* (2013.01)

(56) References Cited

FOREIGN PATENT DOCUMENTS

| | | | |
|---|---|---|---|
| JP | 1-164795 U | 11/1989 | |
| JP | 2-4602 U | 1/1990 | |
| JP | 5-17125 Y2 | 5/1993 | |
| JP | 2001-9206 A | 1/2001 | |
| JP | 2006-297360 A | 11/2006 | |
| JP | 2014-69099 | * 4/2014 | ............ B01D 19/00 |
| JP | 2014-69099 A | 4/2014 | |
| JP | 2018-34123 A | 3/2016 | |
| WO | WO 01/21303 A1 | 3/2001 | |
| WO | WO 2014/010062 A1 | 1/2014 | |

OTHER PUBLICATIONS

English language machine translation for JP 2014-69099. Retrieved from translationportal.epo.org on Jan. 16, 2024. (Year: 2024).*
International Search Report, issued in PCT/JP2019/042273, dated Feb. 10, 2020.
Extended European Search Report for European Application No. 19923731.4, dated Jan. 24, 2023.

* cited by examiner (A)

(B)

(C)

(A)

(B)

(C)

(D)

(E)

(F)

VACUUM DEAERATOR

TECHNICAL FIELD

The present invention relates to a vacuum deaerator equipped with a refining device.

BACKGROUND ART

In the course of producing various products such as pharmaceutical medicines, cosmetics, foods, and fine chemicals, air bubbles are formed in a liquid form of processing substance, and these air bubbles cause various troubles in production of these products. Because of this, defoaming is performed to a processing substance by using a vacuum deaerator, in this defoaming, it is required to continuously remove the air bubbles in the liquid having from a low viscosity to a high viscosity in a vacuum state. To cope with such a problem, the following prior art references are known as a vacuum deaerator equipped with a refining device. The applicant of the present invention has also brought the deaerator manufactured by M. Techniques Co., Ltd to the market.

In recent years, however, the demand to complete defoaming of even a very small air bubble is increasing, so that there still remains the problem in the defoaming ability. There are also similar situations in removal of a dissolved gas, a VOC (volatile organic compound), and the like.

Patent Document 1 describes a vacuum type continuous centrifugal defoaming machine in which a disk having a cylindrical screen wall with narrow spaces on the circumference thereof is integrally bonded to a guide cylinder surrounding the outer circumferential surface thereof with a space. This guide cylinder covers the upper part of the circular space thereof and is formed a separate circular penetrating space between the outer circumferential surface of the disk in the lower part of the space. This integrated disk and guide cylinder are provided so as to rotate the disk in a processing vessel inside of which is kept in a vacuum state, the lower circumference of the guide cylinder is extended to downward to open the lower surface, and a raw material is supplied to inside of the screen wall having narrow space. The lower part of the processing vessel is made into a funnel shape and the lower end thereof is used as a discharge port, and inside of the funnel shaped part, a spindle is accommodated by forming a penetrating space around thereof.

In the apparatus of Patent Document 1, firstly, a raw material to be processed is blown to the inner circumferential surface of the guide disk through the screen wall having narrow spaces by the action of a centrifugal force of a high-speed rotation so that the raw material to be processed is refined and defoamed.

Secondly, the raw material to be processed becomes a layer on the inner surface of circumferential wall of the guide cylinder whereby the air bubbles are removed by use of the difference in the specific gravity of the centrifugal force.

Thirdly, the raw material to be processed flows downward as a thin film along the circumferential wall surface in the lower part of the guide cylinder thereby increasing the area thereof, so that the air bubbles are removed. It is described that the air bubbles can be efficiently removed because of the first to third effects as described above.

In this case, although the details are not described, from the drawing, since commercially available wedge wire is used for the screen having narrow spaces, and the spaces thereof are continuously connected on the circumference, in order to refine the processing substance, it is required that the screen having very fine spaces is used to perform a high-speed rotation for obtaining a further stronger centrifugal force. In addition, it is essential that the defoaming ability increase as the flight distance of the refined processing substance from the wall having the fine space increases; however, defoaming with a thin film in which the flight distance is reduced in its structure is expected.

According to the inventor of the present invention, from various experimental results, it has been found that defoaming in a flowing-down liquid film under a vacuum condition is difficult in the field of a high degree of defoaming. Therefore, practically, the most important issue of the defoaming ability is to make the processing surface finer with the screen to increase the surface area of the processing substance under a vacuum condition. As the particle diameter of the refined particle becomes smaller, the required flight distance thereof becomes shorter, so that the size of the device can be downsized thereby leading to reduction in the cost thereof. Here, the flight distance means the distance that the processing substance ejected from the screen flies to reach the inner surface of vessel under a vacuum condition.

Patent Document 2 describes that the contact area between the processing fluid and the vacuum is increased by forming the dispersion disk in multi-stages thereby increasing the defoaming rate, but does not sufficiently describe the basis for increase of the defoaming rate.

PRIOR ART DOCUMENTS

Patent Document

Patent Document 1: Japanese Examined Utility Model Application Publication No. H05-17125
Patent Document 2: Japanese Patent Laid-Open Application Publication No. 2001-009206

DISCLOSURE OF INVENTION

Problems to be Solved by the Invention

Namely, neither Patent Document 1 nor Patent Document 2 adequately meets the nowadays requirements described above.

Therefore, the present invention has an object to provide a rotary type vacuum deaerator with which degassing such as deaeration, defoaming, and removal of VOC from a processing substance having flowability such as a liquid state can be achieved to a further advanced degree.

Means for Solving the Problems

The present invention solves the above-mentioned problems by providing a vacuum deaerator comprising a rotating rotor which is provided with a screen arranged in a vessel, inside of which is a vacuum, degassing a processing substance in a liquid state by introducing the processing substance into the rotor from an inner side thereof to cause the processing substance to pass through the screen thereby refining the processing substance, and the screen is a cylindrical shape having a circular cross-section and is in the form of a multi-hole plate having many through holes in a radial direction in the cylindrical screen; openings of a plurality of the penetrating parts formed in an inner wall surface of the screen are made to serve as inflow openings, and openings of a plurality of the penetrating parts formed in an outer wall surface of the screen are made to serve as outflow openings; and an opening area of the inflow opening is configured to be larger than an opening area of the outflow opening.

Further, the function to enhance the degassing effect can be realized by setting a minimum diameter of the opening of the penetrating part in the screen to be in the range of 0.01 or more to 1.00 mm or less.

In addition, the present invention solves the above-mentioned problems by providing a vacuum deaerator equipped with a refining device where in the vacuum deaerator comprising a rotating rotor provided with a screen that is arranged in a vessel, inside of which is a vacuum, and degassing a processing substance in a liquid state by introducing the processing substance into the rotor from an inner side thereof to cause the processing substance to pass through the screen thereby refining the processing substance; and the screen is a wedge wire comprising a plurality of slits on a circumference of the screen and a screen member located between the adjacent slits, and the screen is a cylindrical shape having a circular cross-section, openings of a plurality of the slits formed in an inner wall surface of the screen are made to serve as inflow openings, and openings of a plurality of the slits formed in an outer wall surface of the screen are made to serve as outflow openings, and a space between the inflow opening and the outflow opening is made to serve as a slit space; and a width (So) of the outflow opening in a circumferential direction and a width (Si) of the inflow opening in a circumferential direction are configured to be larger than a width (Sm) of the slit space in a circumferential direction.

Further, the function to enhance the degassing effect can be realized by setting the minimum width of the opening part of a plurality of the slits in the screen to be in the range of 0.01 or more to 1.00 mm or less.

In addition, a further precise degassing performance can be ensured by arranging a temperature adjusting mechanism on the vacuum vessel.

Advantages

The present invention can provide a vacuum deaerator in which a processing substance is further refined and the function to degassing is enhanced.

Further, the present invention can provide an apparatus being miniaturized and low cost.

BEST MODES FOR CARRYING OUT THE INVENTION

Figure 1:
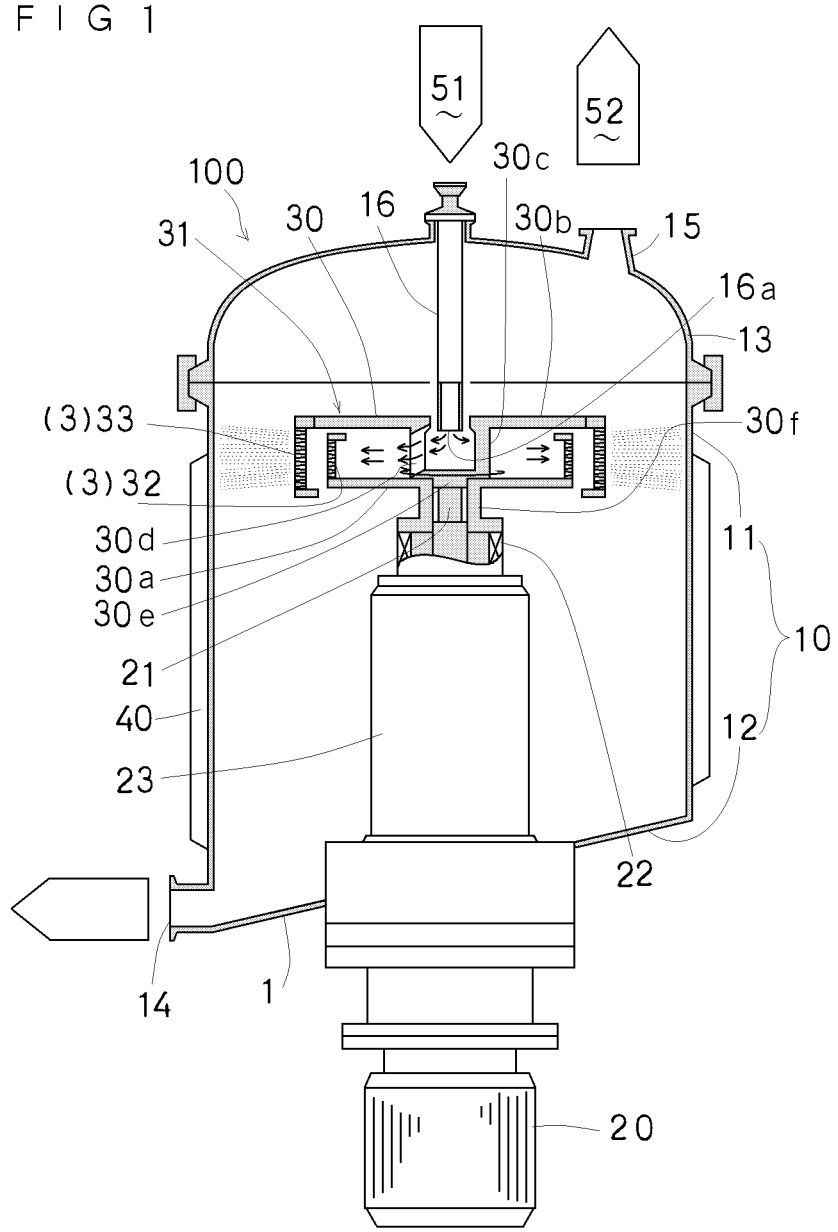
FIG. 1 This is an explanatory drawing of an entire internal structure of the vacuum deaerator equipped with the refining device according to the embodiment of the present invention.

Hereinafter, embodiments of the present invention will be explained with referring to the drawings.

Outline

The vacuum deaerator equipped with the refining device (hereinafter, simply referred to as a deaerator 100) is the apparatus that a processing substance having flowability is introduced into inside of vessel 1 inside of which is in a vacuum state or a reduced pressure space close to vacuum state, and then the processing substance is continuously discharged to outside of the vessel 1 (FIG. 1).

Composition

In the deaerator 100, a rotor 30 that rotates to the vessel 1 (referred to as a rotating rotor 30 if necessary) and a refining device 31 arranged on the rotor 30 are provided on inside of the vessel 1. The processing substance is discharged from a discharge port 14 after being refined and degassed by the refining device 31.

In the vessel 1, the refining device 31 is provided with one or a plurality of cylindrical screens 3 that is arranged on the rotor 30, surrounding a rotation axis of the rotor 30.

By introducing the processing substance into inside of the screen 3 and passing through the screen 3, any one of the processing substance and air bubbles in the processing substance or both is refined and degassed.

Figure 2:
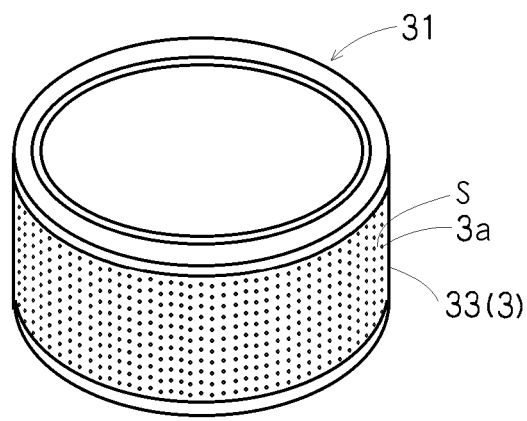
FIG. 2A is a rough perspective view illustrating the appearance of the screen that is equipped to the vacuum deaerator of FIG. 1.
FIG. 2B is a rough perspective view of a modified example of the above-described screen.
FIG. 2C is the enlarged drawing of the essential part of the communication part illustrating further modified example of FIG. 2B.
Figure 2:
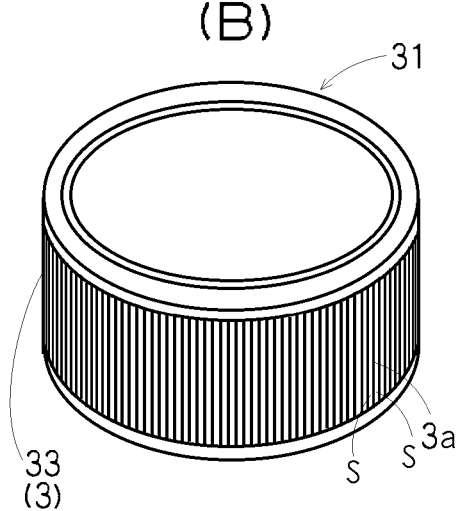
Figure 2:
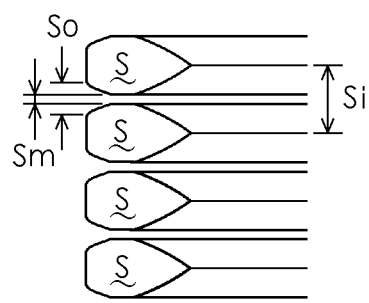
Figure 3:
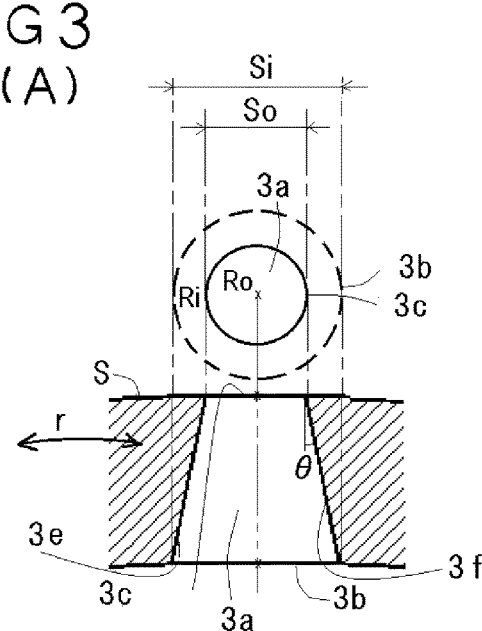
FIG. 3A is the enlarged cross-sectional view of the essential part of the communication part arranged on the screen of FIG. 2A.
FIG. 3B to FIG. 3F are the enlarged cross-sectional views of the essential parts of the modification examples of the communication part.
Figure 3:
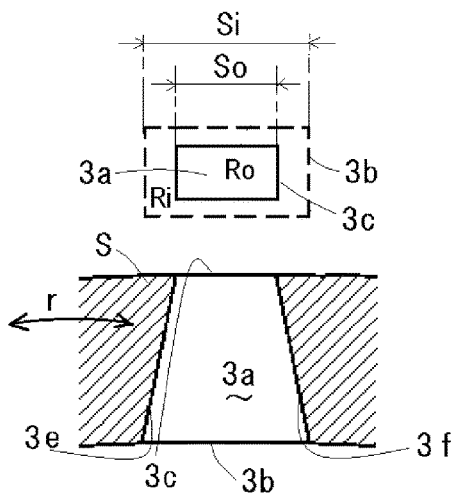
Figure 3:
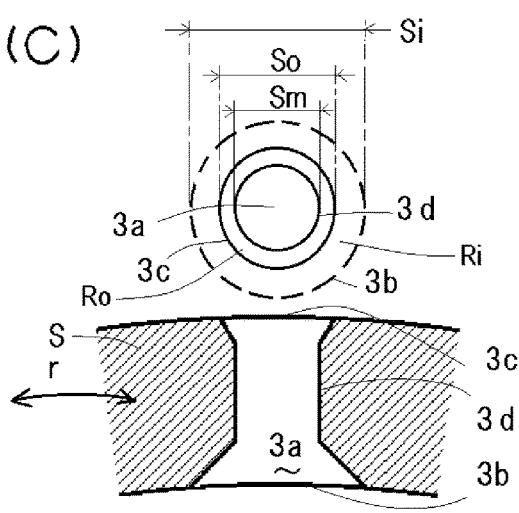
Figure 3:
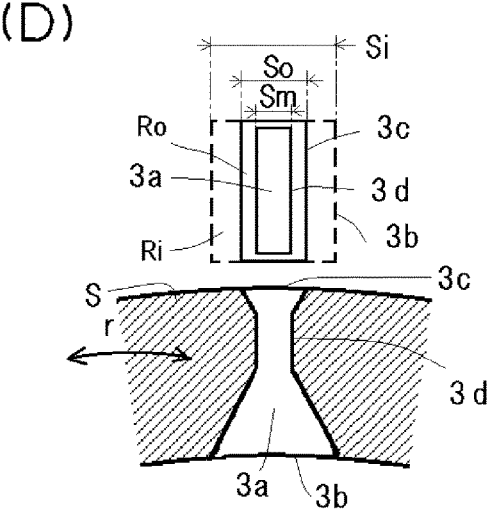
Figure 3:
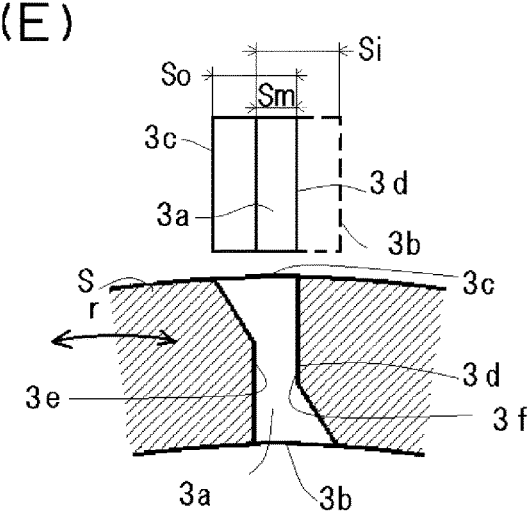
Figure 3:
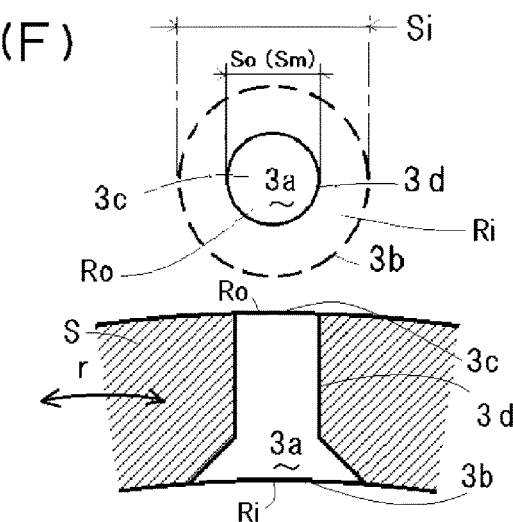

The screen 3 contains a plurality of the spaces which communicate between the inside and outside of the cylindrical screen 3 as communication parts 3a (FIG. 2A and FIG. 3A). In each communication parts 3a, an opening in the inner wall surface side of the cylindrical screen 3 is made to serve as an inflow opening 3b, and an opening in the outer wall surface side of the cylindrical screen 3 is made to serve as an outflow opening 3c (FIG. 3A).

For at least one of the screens 3, at least part of the section between the inflow opening 3b and the outflow opening 3c of the communication part 3a is an action space which facilitates refining of the processing substance. In this action space, the cross-sectional area thereof is gradually decreased from the side of the inflow opening 3b toward the side of the outflow opening 3c.

Hereinafter, each composition will be described in more detail.

Vessel 1

The vessel 1 is a container that is tightly sealed so as to keep a pressure therein at a high vacuum of about 5 to about 0.1 Pa. In this embodiment, a container main body 10 is connected to a cover body 13 arranged on the main body and a bottom part 14 so as to be openable and closable. Specifically, the container main body 10 contains a cylindrical part 11 arranged on the upper part of the main body and a bottom part 12 arranged on the lower part of the cylindrical part 11. In this example, the bottom part 12 is the bottom part having gradient to easily perform discharge. In the lower end of the bottom part 12 having gradient, the discharge port 14 is arranged to discharge the processing substance after degassing treatment to outside of the vessel.

The container main body 10 is provided with a temperature adjusting mechanism 40 such as a jacket through which a temperature adjusting fluid such as hot water or cold water is flowed along the outer wall surface of the main body. Alternatively, the temperature adjusting mechanism 40 may be arranged on the cover body 13. The temperature adjusting mechanism 40 may be used to keep the processing substance inside the vessel 1 in a predetermined temperature range or to heat and cool the processing substance as necessary. The temperature adjusting mechanism 40 may adopt a well-known means other than the jacket.

The cover body 13 is provided with a vacuum port 15 for keeping inside of the vessel 1 in a vacuum state, and a gas inside of the vessel 1 is discharged to outside by a vacuum pump 53 that is connected to the vacuum port 15, so that the inside of the vessel 1 becomes in the vacuum state of a predetermined pressure.

It is preferable that the inside of the vessel 1 (container) be in the complete vacuum state, however, this may be in a reduced pressure state close to a vacuum as far as degassing can be properly carried out.

The vessel 1 is provided with an introduction pipe 16 through which the processing substance is introduced into the inside of cylindrical screen 3 in the vessel 1 from supply source of the processing substance arranged outside of the vessel 1. In this example, a discharge port 16a (introduction port into the vessel 1) of the introduction pipe 16 is arranged on the central axis of the rotating cylindrical screen 3. In this example, the introduction pipe 16 for supplying the processing substance into the vessel 1 is arranged on the cover body 13, and the discharge port 16a in the lower end of the introduction pipe 16 is arranged on the central axis so that the processing substance is introduced into the vessel 1 from a supply source 51 such as a tank to which the introduction pipe 16 is connected.

The flanges of both the container main body 10 and the cover body 13 are disposed so as to be faced with each other and are fixed ensuring airtightness under the reduced pressure thereby being configured integral vessel 1. Here, the vessel 1 may be divided into two portions at any position, and the connecting means therebetween may be arbitrary changed.

Refining Device 31

The refining device 31 is arranged at the position corresponding to the cylindrical part 11 of the container main body 10, and this includes the rotating rotor 30 (corresponding to the rotor in the claims) and the screen 3 (FIG. 1). In this example, the refining device 31 includes two screens 3 of a first screen 32 and a second screen 33 (FIG. 1).

The diameter of the cylindrical second screen 33 is larger than the diameter of the cylindrical first screen 32, and the second screen 33 is arranged outside the first screen 32. In this example, the rotating rotor 30 includes a lower-side plate 30a and an upper-side plate 30b. The upper-side plate 30b is arranged above the lower-side plate 30a with a distance to the lower-side plate 30a. Both the lower-side plate 30a and the upper-side plate 30b are disks arranged such that the disk surfaces are facing to upward and downward.

In this example, the diameter of the upper-side plate 30b is larger than the diameter of the lower-side plate 30a, the first screen 32 is arranged on the outer circumference part of the lower-side plate 30a and extends upward, and the second screen 33 is arranged on the outer circumference part of the upper-side plate 30b and extends downward.

In the center of the lower surface of the upper-side plate 30b, a cylindrical introduction chamber 30c is formed so as to be concentric with the upper-side plate 30b. The upper end of the cylindrical introduction chamber 30c is integrated with the lower surface of the upper-side plate 30b, and the inside of the introduction chamber 30c is communicated to the hollow part of the donut-shaped upper-side plate 30b. On the side of the introduction chamber 30c, an opening 30d between which communicates the inside and outside of the introduction chamber 30c is formed. The center of lower end of the introduction chamber 30c includes a protruding part 30e that protrudes downward.

At the center of lower surface of the lower-side plate 30a, a cylindrical neck part 30f extending downward with a vertical center line is formed. The inside of the hollow neck part 30f is communicated to the hollow part of the donut-shaped lower-side plate 30a.

The protruding part 30e of the introduction chamber 30c may be fitted into the hollow part of the lower-side plate 30a rotatably to the lower-side plate 30a and may slide to the lower-side 30a to change the direction; in this example, however, the protruding part 30e is attached so as not to rotate to the lower-side plate 30a.

A driving axis 21 of an electric motor 20 for the rotor is passed through the neck part 30f, and the front end (upper end) of the driving axis 21 is fixed to the protruding part 30e.

The driving axis 21 of the electric motor 20 for the rotor, which will be described later, is arranged on the center line of the cylindrical first screen 32 and second screen 33 extending vertically.

The introduction pipe 16 extends downward penetrating through the center of the cover body 13, and the lower end thereof, namely, the discharge port 16a is arranged on the hollow part of the donut-shaped upper-side plate 30b. The processing substance discharged from the discharge port 16a is introduced into the introduction chamber 30c and is released to the inner circumferential surface of the first screen 32 from the opening 30d of the introduction chamber 30c that is rotated by driving of the driving axis 21 of the electric motor 20 for the rotor.

On the other hand, the lower-side plate 30a rotates by indirectly receiving the driving force of the driving axis 21 from the protruding part 30e by contacting with the protruding part 30e.

Here, the diameter of the lower-side plate 30a may be larger than the diameter of the upper-side plate 30b, and the first screen 32 may be arranged on the upper-side plate 30b and the second screen 33 may be arranged on the lower-side plate 30a.

As described above, the rotating rotor 30 is rotated by the rotation axis 21. Specifically, the rotation axis 21 is rotated by the electric motor 20 for the rotor arranged outside of the bottom part 12 via a power transmission unit 23 for the rotor.

Also, a sealing device 22 of the rotation part is arranged.

In the inner circumferential side of the rotating rotor 30, as described above, the introduction pipe 16 is arranged, the processing substance is introduced toward the rotating rotor 30 from the charging port (discharge port 16a) at the front end of the introduction pipe 16.

The processing substance having advanced to the outer circumferential direction of the rotating rotor 30 due to the centrifugal force passes through the first screen 32 and the second screen 33 that are arranged in a ring-like form, so that the defoaming effect is enhanced.

In this example, the communication part 3a of each the screens 3 (the first screen 32 and the second screen 33) is the penetrating part, particularly the fine penetrating hole, namely the fine hole (FIG. 2A). Particularly in this example, an opening area (Ri) of the outflow opening 3c of the communication part 3a of the second screen 33 is smaller than an opening area (Ro) of the inflow opening 3b. In these communication parts 3a, the entire section between the inflow opening 3b and the outflow opening 3c is made to serve as the action space (FIG. 3A).

As shown in FIG. 3A, in this example, the communication part 3a is narrowed in a truncated cone shape, namely a mortar-like form, from the inflow opening 3b toward the outflow opening 3c.

The screen 3 is a perforated plate having a plurality of the fine holes.

A plurality of the fine holes formed in the screen 3 (communication part 3a) may be randomly distributed in the front and back surfaces of the screen 3, but they may be distributed in a plurality of rows arranged vertically, horizontally, or diagonally, or they may be distributed in other regularly arranged rows. In particular, it is preferable that these fine holes be uniformly distributed in the screen 3.

The first screen 32 may also be an independent perforated plate provided with the communication part 3a having the similar action space as in the second screen 33, however, in this example, the first screen 32 employs an existing punching plate (FIG. 2A) or an existing wedge wire screen. Here, the first screen 32 is used as the punching plate.

In these communication parts 3a, the action space at the end part of the outflow opening side, that is, the diameter of the action space at the terminal point of the section is 0.01 mm or more to 1.00 mm or less.

In the second screen 33, as mentioned above, the penetrating part (communication part 3a) gradually reduces the cross-section (the cross-section perpendicular to the moving direction of the fluid) toward the side of the outflow opening 3c from the side of the inflow opening 3b, namely, which is the space being narrower as advancing toward the end part thereof.

The screen 3 includes a screen main part S and a plurality of the penetrating parts 3a.

In this example, the area between the penetrating parts 3 adjacent to each other in a circumferential direction of the screen 3 that coincides with the rotation direction of the rotating rotor 30 is the screen main part S.

The screen 3 may be one, namely only the second screen 33, however, in this example in which one driving axis is used, since the centrifugal force is larger in the second screen 33, it is preferable that the first screen 32 be a perforated plate having a larger opening (communication part 3a) than that of the second screen 33. As described above, the screen having relatively large opening such as the punching plate or the wedge wire can be used as the first screen 32, and the second screen 33 can be used as the perforated plate having independently formed smaller opening than the punching plate or the wedge wire.

Here, the first screen 32 may be the one having the action space in which the fine hole serves as the communication part 3a.

As described above, the openings of the plurality of the penetrating parts (fine holes that are communication part 3a) provided on the inner wall surface of the screen 3 are served as inflow openings 3b, the opening of the plurality of the penetrating parts provided on the outer wall surface of the screen are served as outflow openings (FIG. 3A), the processing substance can be further refined by using the second screen 33 having the fine holes provided so that the opening area (Ri) of the inflow opening is made larger than the opening area (Ro) of the outflow opening, whereby the degassing performance is further enhanced.

Note that, two or more of the screens 3 such as a third screen and a fourth screen may be used. The processing substance that is passed through the rotating rotor 30 and the second screen 33 becomes extremely small fine particles, flies under a vacuum condition, and then reaches the inner wall surface of the cylindrical part 11. The degassing effect become apparent to the maximum on the flight distance at this time.

When the processing substance is atomized, with decreasing the particle size thereof as small as possible, the specific surface area of the particle increases as well as the distance to the central part thereof decreases, so that complete degassing may become possible. On the contrary, in the comparatively large particle, the specific surface area thereof becomes smaller and the distance to the central part thereof becomes longer, as well as the flight time to reach the inner surface of the vessel 1 becomes shorter, so that the distance from the outer surface of the second screen 33 to the inner surface of the vessel 1 needs to be increased in order to obtain the degassing effect, which inevitably leads to the increase in the size of the machine. Therefore, the atomization of the processing substance becomes big problem, thus, the present invention was conceived.

When the centrifugal force is the same, the discharge performance of the processing substance depends on the area of the penetrating hole. Therefore, with the conventional technology, the area could not be significantly made small, so that a large motor capable of rotating with a higher rotation number was required in order to increase the centrifugal force.

By using the technique of the present invention, the pressure loss is reduced, and the liquid is smoothly passed, so that the atomization of the processing substance can be realized.

As described above, when the opening area (Ro) of the inflow opening 3*b* is made larger than the opening area (Ri) of the outflow opening 3*c* in the penetrating hole (communication part 3*a*), this device can express a high degassing effect. Further, when the cross-sectional area thereof is gradually decreased from the side of the inflow opening 3*b* toward the side of the outflow opening 3*c*, the passing speed therein increases so that the processing substance becomes the fine liquid droplets and flies.

Regardless of particularly having and not having the action space, the above-mentioned effect can be expressed furthermore as far as the minimum opening diameter of the penetrating part (communication part 3*a*) of the screen 3 is set to in the range of 0.01 mm or more to 1.00 mm or less.

The material of the screen 3 may be various metals such as stainless steel, as well as resins, ceramics, and the like.

In any of the first screen 32 and the second screen 33, the plate-like material may be processed to the cylindrical shape after the holes are made therein, or an originally cylindrical shaped material may be processed to have the holes therein. The hole-drilling of penetrating holes may be performed by an etching processing, an electroforming processing, a laser processing, or a cutting processing; alternatively, a commercially available product may be used, or the shape of the hole may be any of circular, rectangular, hexangular, and the like.

In the example shown in FIG. 3A, the width So of the inflow opening 3*b* in the circumferential direction of the screen 3 is smaller than the width Si of the outflow opening 3*c*. In this case, the narrow angle θ (inclining angle) against the straight line passing through the center of the inflow opening 3*b* and the center of the outflow opening 3*c* is preferably in the range of 1 to 45 degrees in the generating line of the communication part 3*a*, which is the truncated conical shape.

Modification Examples

The communication part 3*a* may be a truncated pyramid rather than the truncated cone. FIG. 3B shows the example of the communication part 3*a* having the truncated square pyramid. In the communication part 3*a* shown in FIG. 3B, a couple of the front and rear slant faces in the rotation direction are a rear face 3*e* and a front face 3*f*, and the narrow angle to the center line is the same as the generating line of the FIG. 3A.

Further, the communication part 3a may be provided with a minimum cross-sectional part 3d having cross-sectional area smaller than that of the inflow opening 3b and the outflow opening 3c in the middle of the section from the inflow opening 3b to the outflow opening 3c (FIG. 3C to FIG. 3E). Specifically, in the communication part 3a, the cross-sectional area thereof is gradually decreased from the inflow opening 3b toward the minimum cross-sectional part 3d.

Further, in the penetrating part 3a, the cross-sectional area thereof is gradually increased from the minimum cross-sectional part 3d toward the outflow opening 3c. The minimum cross-sectional part 3d is the narrow part arranged in the penetrating part 3a.

The minimum cross-sectional part 3d may be a ring-like ridge not having the width formed between the inflow opening 3b and the outflow opening 3c (not shown in the drawing). Also, the minimum cross-sectional part 3d may be a minimum diameter section having a certain width between the inflow opening 3b and the outflow opening 3c (FIG. 3C to FIG. 3E).

When the minimum cross-sectional part 3d is provided, the cross-sectional area of the outflow opening 3c may be smaller than that of the inflow opening 3b, or as far as the effect of the present invention can be obtained, the cross-sectional area of the inflow opening 3b may be smaller than that of the outflow opening 3c.

In the examples shown in FIG. 3C to FIG. 3E, in the circumferential direction r (rotation direction) of the screen 3, the communication part 3a includes the minimum cross-sectional part 3d having the width Sm narrower than the inflow opening 3b and the outflow opening 3c in the middle of the section from the inflow opening 3b to the outflow opening 3c. Specifically, in the circumferential direction of the screen 3, the width of the communication part 3a is gradually reduced from the inflow opening 3b toward the minimum cross-sectional part 3d. Also, in the circumferential direction r of the screen 3, the width of the communication part 3a is gradually increased from the minimum cross-sectional part 3d toward the outflow opening 3c.

As the modification example of FIG. 3C, as shown in FIG. 3F, the outflow opening 3c may be the termination end of the minimum cross-sectional part 3d (end of the outflowing side).

The communication part 3a may be the circular cross-section, namely a shape of hourglass, in the entire section from the inflow opening 3b to the outflow opening 3c, as described above (FIG. 3C), or the cross-section in the entire section may be rectangular (FIG. 3D).

When the cross-section in the entire section of the communication part 3a is made rectangular, the ratio of the sides of the rectangular may be changed vertically and horizontally (FIG. 3E).

The communication part 3a in FIG. 3E may be a hole, but a slit (cutout part) is suitable.

In the case that the communication part 3a having the minimum cross-sectional part 3d is to gradually decrease the cross-sectional area from the inflow opening 3b to the minimum cross-sectional part 3d (provided with the action space), or in the case that the communication part 3a not having the minimum cross-sectional part 3d is to gradually decrease the cross-sectional area from the inflow opening 3b to the outflow opening 3c (provided with the action space), in any case, the cross-section of the entire section of the communication part 3a may be a polygon more than triangle or pentagon, or may be a curved line shape other than a circle or a combination of a curved line and a straight line.

Further, the entire section of the communication part 3a may have the section having the cross-sectional shape different from that of other section, and these various modifications are possible.

The screen 3 (second screen 33) is not restricted to the screen having fine penetrating holes; the wedge wire screen using the wedge wire may be adopted as described above (FIG. 2B and FIG. 2C). The wedge wire is the wire having a wedge-shaped cross-section.

When adopting the wedge wire screen, it is necessary to use the one having the finest space. Each wedge wire may extend in the circumferential direction r of the screen 3 (FIG. 2C) or may extend in the vertical direction (FIG. 2B). In the example shown in FIG. 2B, the independent wedge wire is the screen main body S described above.

When the wedge wire is extended in the circumferential direction r, the communication part 3a continuously extends in the circumferential direction r; therefore, it is necessary that a plurality of the communication parts 3a arranged on the inner wall surface of the screen 3 is made to the slit space, and that the width (So) of the outflow opening 3c in the perpendicular direction and the width (Si) of the inflow opening 3b in the perpendicular direction are made so as to be wider than the width (Sm) of the slit space in the perpendicular direction (FIG. 2C). Because the space is continuous, the purpose of this is to expand the flow path after reducing the flow path to cut the continuous flow thereby conducting the atomization. With this, the disadvantage of the continuous space can be overcome.

In this case, when the minimum vertical width of a plurality of the slit spaces (communication part 3a) in the screen 3 is in the range of 0.01 mm or more to 1.00 mm or less, the effect can be expressed further eminently.

On the contrary to the example of FIG. 1, the discharge port 16a of the introduction pipe 16 may be arranged at the eccentric position that is apart from the center axis of the rotating cylindrical screen 3 (not shown).

Further, in the example of FIG. 1, by arranging the power unit such as the electric motor 20 for the rotor below the rotating rotor 30, the introduction pipe 16 can be arranged at the central axis of the rotating rotor 30 from above the rotating rotor 30. Alternatively, by arranging the introduction pipe 16 in the position apart from above the central axis of the rotating rotor 30 as described above, the power unit can be arranged above the rotating rotor 30. When the power unit is arranged above the rotating rotor 30, the extending part (rotation shaft) having the driving axis 21 which extends to below the rotating rotor 30 is provided, and a rotary discharge blade is provided on the extending part, whereby function to conduct the continuous discharge of the defoamed processing substance from the discharge port 14 can be enhanced (not shown).

Specifically, the lower part of the container main body 10 is made to a funnel part having a funnel shape that tapers downward, the discharge port 14 is arranged at the lowermost part of the funnel part, and the rotary discharge blade is made to a spiral plate-like body whose side end is along the inner circumferential surface of the funnel part and whose front and back plate surfaces thereof are faced upward and downward, and the rotary discharge blade is fixed to the extending part passing through the center line of the spiral plate-like body via a rod-shaped supporting body. With rotation of the extending part, the spiral rotary discharge blade rotates to transfer the processing substance downward along the inner circumferential surface of the funnel part so that the processing substance can be continuously discharged from the discharge port 14 to outside of the vessel 1.

REFERENCE NUMERALS

1 Vessel
3 Screen
3*a* Communication part
3*b* Inflow opening
3*c* Outflow opening
10 Container main body
11 Cylindrical part
12 Bottom part
13 Cover body
14 Discharge port
15 Vacuum port
16 Introduction pipe
16*a* Discharge port (of introduction pipe 8)
20 Electric motor for rotor
21 Driving axis
22 Sealing device
23 Power transmission unit for rotor
30 Rotating rotor (rotor)
30*a* Lower-side plate
30*b* Upper-side plate
30*c* Introduction chamber
30*d* Opening
30*e* Protruding part
30*f* Neck part
31 Refining device
32 First screen
33 Second screen
40 Temperature adjusting mechanism
51 Supply source
52 Vacuum pump
100 (Vacuum) deaerator
S Screen main part

The invention claimed is:

1. A vacuum deaerator comprising:
a rotating rotor which is provided with a screen arranged in a vessel,
wherein the screen is a cylindrical plate having a plurality of through holes extending in a radial direction;
wherein openings of a plurality of penetrating parts formed in an inner wall surface of the screen are made to serve as inflow openings, and openings of a plurality of the penetrating parts formed in an outer wall surface of the screen are made to serve as outflow openings; and
wherein an opening area of the inflow opening is configured to be larger than an opening area of the outflow opening.

2. The vacuum deaerator according to claim 1, wherein a minimum diameter of the opening of the penetrating part in the screen is in the range of 0.01 or more to 1.00 mm or less.

3. A vacuum deaerator equipped with a refining device, comprising:
a vessel;
a rotating rotor in the vessel,
a screen on the rotor for degassing a liquid,
wherein the screen is a wedge wire screen comprising a plurality of slits on a circumference of the screen and a screen member located between the adjacent slits, and the screen is a cylindrical shape,
openings of a plurality of the slits formed in an inner wall surface of the screen are made to serve as inflow openings, and openings of a plurality of the slits formed in an outer wall surface of the screen are made to serve as outflow openings, and a space between the inflow opening and the outflow opening is made to serve as a slit space; and
a width of the outflow opening in a circumferential direction and a width of the inflow opening in a circumferential direction are configured to be larger than a width of the slit space in a circumferential direction.

4. The vacuum deaerator according to claim 3, wherein a minimum width of the opening part of a plurality of the slits in the screen is in the range of 0.01 mm or more to 1.00 mm or less.

5. The vacuum deaerator according to claim 1, wherein a temperature adjusting mechanism is arranged on the vacuum vessel.

6. The vacuum deaerator according to claim 2, wherein a temperature adjusting mechanism is arranged on the vacuum vessel.

7. The vacuum deaerator according to claim 3, wherein a temperature adjusting mechanism is arranged on the vacuum vessel.

8. The vacuum deaerator according to claim 4, wherein a temperature adjusting mechanism is arranged on the vacuum vessel.

9. The vacuum deaerator according to claim 3, wherein the wedge wire screen comprises a plurality of parallel wires extending in the circumferential direction.

10. The vacuum deaerator according to claim 3, wherein the wedge wire screen comprises a plurality of parallel wires extending in the vertical direction.

11. The vacuum deaerator according to claim 3, wherein a cross sectional area of each of the openings continuously decreases from inflow opening to the outflow opening.

12. The vacuum deaerator according to claim 1, wherein a cross sectional area of each of the openings continuously decreases from inflow opening to the outflow opening.

* * * * *